June 21, 1960   K. L. KING ET AL   2,942,119
PHOTOELECTRIC DRIFT ANGLE AND GROUND SPEED METER
Filed March 12, 1953                               2 Sheets-Sheet 1
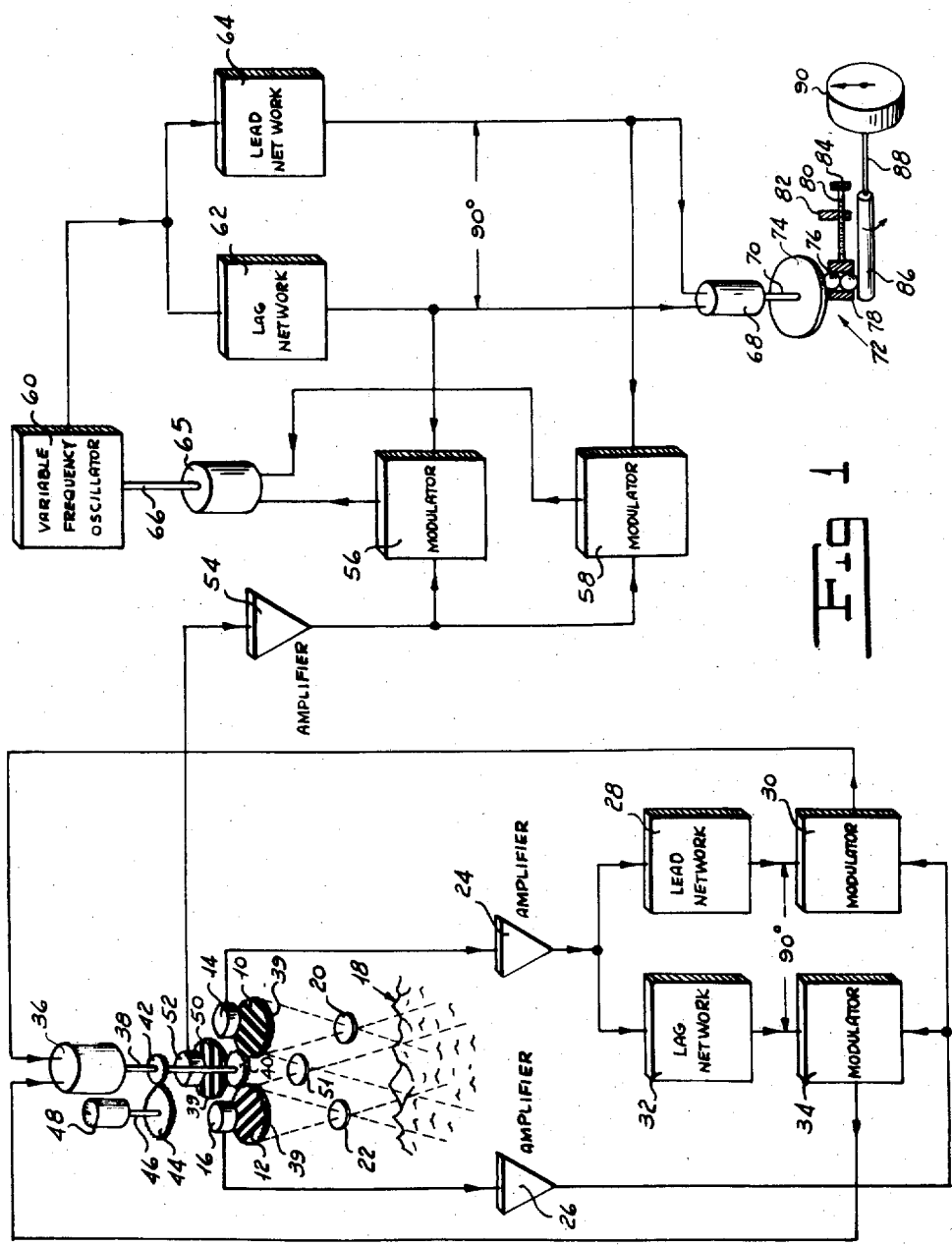
INVENTOR.
KENNETH L. KING
JAMES C. MATHIESEN
BY
       Harry L. Shenier
                ATTORNEY

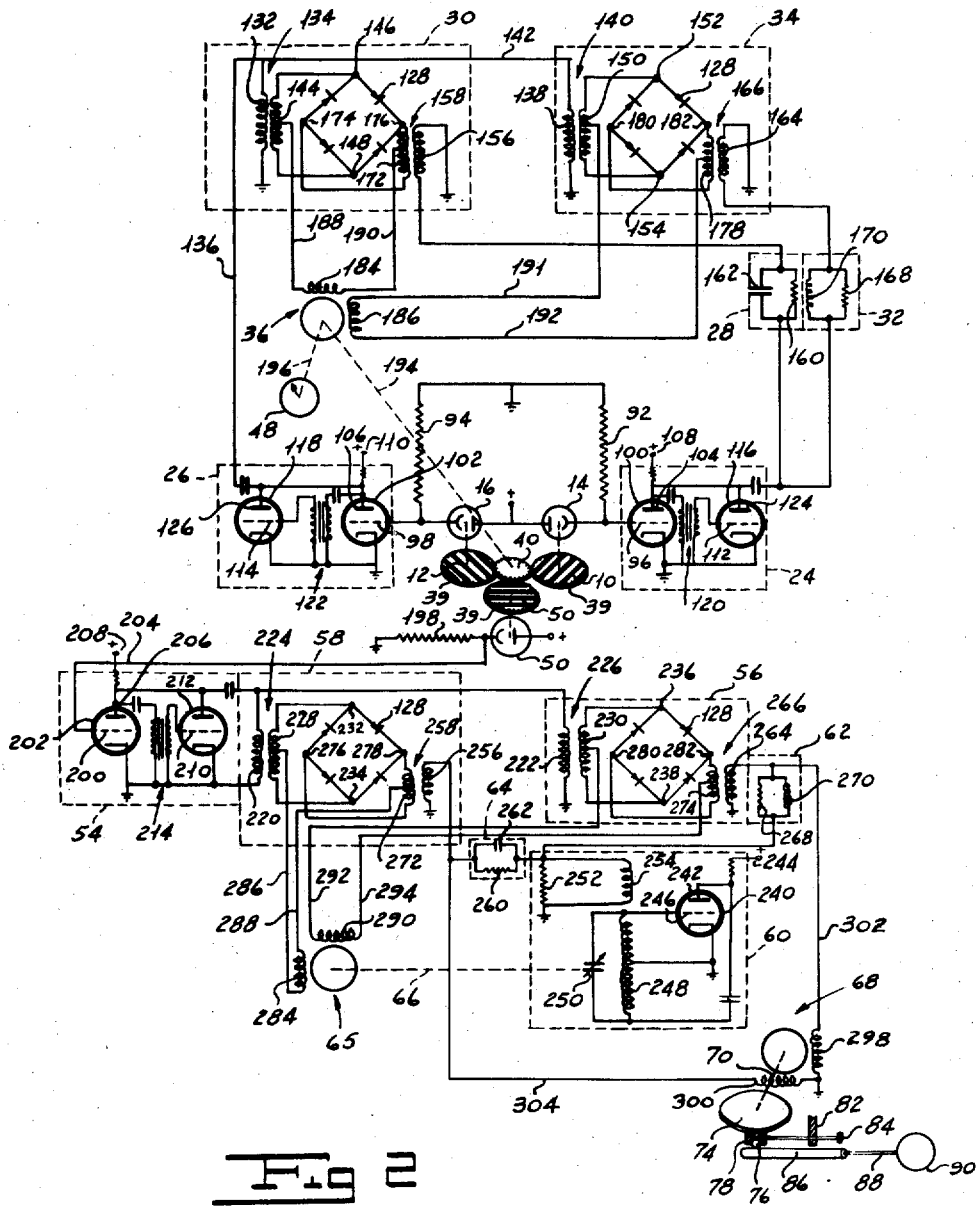

United States Patent Office 2,942,119
Patented June 21, 1960

2,942,119

PHOTOELECTRIC DRIFT ANGLE AND GROUND SPEED METER

Kenneth L. King, Scarsdale, N.Y., and James C. Mathiesen, Berkeley, Calif., assignors, by mesne assignments, to United Aircraft Corporation, East Hartford, Conn., a corporation of Delaware Filed Mar. 12, 1953, Ser. No. 341,964

7 Claims. (Cl. 250—209)

Our invention relates to a photoelectric drift angle and ground speed meter and more particularly to a combined photoelectric drift angle and ground speed meter wherein extremely accurate measurements of drift angle and ground speed are achieved.

A difficult problem confronting an aviator attempting to travel a predetermined course with respect to the ground is the measurement of the angle of drift with respect to the course. The determination of ground speed along the course made good is a more difficult problem. We can measure true air speed, but it is very difficult to measure drift velocity. To measure ground speed, it has been suggested in the prior art that a lattice or grating having alternate opaque and transparent portions be placed in front of a phototube so that the light reflected from the surface of the earth strikes the phototube cathode, and the phototube produces an output voltage having a frequency which is a function of the ratio of ground speed to altitude. In the prior art devices, this output frequency is measured, and the resulting indication is corrected for altitude to give an indication of ground speed. In order that the true ground speed be obtained, however, the drift angle must be determined and this indicated ground speed corrected for drift, since the phototube output is also a function of the angle the grating makes with the actual line of flight with respect to the ground. We have invented a combined drift angle and ground speed meter wherein the feed-back principle is employed to obtain accurate measurements of drift angle and ground speed. The arrangement of our meter is such that the correction initiated by the drift angle measuring system when a deviation from line of flight occurs is immediately fed into the ground speed measuring system so that the ground speed indications are continuously and automatically corrected for drift. The resulting output of the ground speed measuring system is directly proportional to the ratio of ground speed to altitude, and is corrected for altitude so that an accurate measurement of ground speed is achieved. When ground speed is to be used as the control function in a computer for a bomb director, it must be generated as a rotary motion whose velocity is a function of ground speed.

One object of our invention is the provision of a photoelectric drift angle and ground speed meter wherein the feed-back principle is employed to obtain extremely accurate measurements of the drift angle and ground speed of an airplane.

Another object of our invention is to provide a photoelectric drift angle and ground speed meter in which the ground speed measurement is continuously and automatically corrected for drift.

Another object of our invention is to provide a photoelectric drift angle and ground speed meter in which the ground speed measurement is corrected for altitude.

Another object of our invention is the provision of a combined photoelectric drift angle and ground speed meter.

Another object of our invention is to provide a ground speed meter which will produce a rotary movement, the velocity of which is a function of ground speed along the course made good.

Other and further objects of our invention will appear from the following description.

In general our invention contemplates the provision of a pair of gratings, having alternate parallel transparent and opaque lines or areas, arranged in front of a pair of phototubes and disposed with their lines at a predetermined angle to the line of flight of the airplane so that light reflected from the terrain over which the plane is traveling passes through the gratings and impinges on the phototube cathodes. Since the terrain is an irregular reflector of light, the frequency of the output of each of the phototubes as the plane passes over the terrain will be a function of the speed at which the plane is traveling and the angle at which the gratings are disposed with respect to the line of flight. We provide means for comparing the phototube output signals to obtain difference frequency signals, the frequency of which is a measure of the amount of deviation of the line of flight of the aircraft and the phase rotation between which is determined by the direction of the deviation. These signals actuate means for rotating the gratings to positions where they make the same angle with the line of flight such that the rotation of the gratings in response to deviations in line of flight is a measure of drift. Suitable indicating means is coupled to the means for rotating the gratings and calibrated in appropriate drift units. A third similar grating is arranged with its alternate transparent and opaque lines perpendicular to the line of flight in front of a third phototube such that the phototube output contains a frequency which is proportional to the ratio of ground speed to altitude so long as the grating remains perpendicular to the line of flight. We provide means for comparing the output frequency of this phototube with that of the output of a variable frequency oscillator to obtain difference frequency signals, the frequency of which is a measure of the amount of the difference in frequency between the phototube and variable frequency oscillator output signals and the phase rotation between which signals is determined by the direction of the difference. These signals actuate means for varying the frequency of the oscillator output until it equals the output frequency of the phototube. Thus the frequency of the variable frequency oscillator is proportional to ground speed over altitude. We provide means driven by the oscillator output to drive a multiplier to correct for altitude. The output of the multiplier is a rotary movement, the speed of which is a function of ground speed. This may be fed to a computer. If desired, the speed of rotation can be measured by a tachometer calibrated in ground speed. This third grating is also driven by the synchronous motor which drives the drift angle gratings, the rotation of which is a function of drift angle, and the ground speed measurement is thereby continuously and automatically corrected for drift. The feed-back principle is employed in both the drift angle and ground speed measuring systems so that extremely accurate indications are achieved.

In the accompanying drawings which form part of the instant specification and which are to be read in conjunction therewith and in which like reference numerals are used to indicate like parts in the various views:

Figure 1 is a schematic view of our photoelectric drift angle and ground speed meter in which the electrical circuits are indicated by a block diagram.

Figure 2 is a schematic view of our photoelectric drift angle and ground speed meter in which the electrical circuits are shown in detail.

More particularly, referring now to Figure 1, we arrange a pair of gratings 10 and 12 having alternate parallel transparent and opaque lines or areas in front of a pair of phototubes 14 and 16 and dispose the grating so that the lines of one of the gratings extend at a convenient angle such as 90° to the lines of the other of the gratings. Light from the terrain over which an aircraft is flying, indicated generally by reference numeral 18, is focused by a pair of lenses 20 and 22 upon the gratings 10 and 12 and passes onto the cathodes of phototubes 14 and 16. We dispose these gratings 10 and 12 with their lines or areas at the same angle with respect to the predetermined line of flight or desired heading of the airplane. The output of each of the photocells 14 and 16 is a voltage proportional to the total illumination reaching them. Since the terrain is irregular, if the lines of the gratings are perpendicular to the line of flight, the output signals of the phototubes contain a fundamental frequency proportional to the product of the velocity of the projected image across the surface of the grating and the number of lines per unit distance in the grating. If we rotate the grating through an angle of forty-five degrees to the line of flight, this frequency will be .707 of the original value. Conveniently, we position grating 10 forty-five degrees clockwise from the line of flight and the grating 12 forty-five degrees counterclockwise from the line of flight so that the fundamental frequency of the output variation is the same in both cells 14 and 16. Photocells 14 and 16 are connected respectively to amplifiers 24 and 26. We feed the output of amplifier 24 to lead and lag networks 28 and 32 and thence, respectively, to balanced modulators 30 and 34. We select the parameters of the phase shift networks 28 and 32 to produce outputs with a ninety degree phase shift between them over a wide frequency range. The output of amplifier 26 is fed to both of the modulators 30 and 34. Modulators 30 and 34 produce signals containing voltages which are of a frequency equal to the difference frequency between the two phototube voltages (lower side band) and which have a phase rotation between them determined by the direction of the difference. We impress these output signals on the windings of a synchronous motor 36 which drives a shaft 38. While the output signals also contain an upper side band, its frequency is so high that the rotor of the motor will not respond owing to its inertia, and hence the sum frequency may be disregarded. It is to be understood that, if desired, a discriminatory filter network may be employed to eliminate the upper side band. A gear 40 on the end of shaft 38 meshes with teeth 39 formed on the edges of gratings 10 and 12 so that the motor may rotate the gratings to bring them symmetrical to the line of flight. A second gear 42 is fixed on shaft 38 and meshes with a gear 44 which drives the shaft 46 of a meter 48, calibrated in appropriate units to indicate drift angle.

We place a third grating 50, having similar alternate, parallel transparent and opaque lines or areas, in front of a photocell 52 with its lines or areas perpendicular to the line of flight. Light reflected from the terrain is focussed by a lens 51 upon grating 50 and passes onto the cathode of phototube 52. Since we arrange grating 50 perpendicular to the line of flight, photocell 52 has an output which is proportional to the ratio of ground speed to altitude. The output of phototube 52 is passed to an amplifier 54, the output of which is fed to a pair of balanced modulators 56 and 58. We provide a variable frequency oscillator 60 and feed its output to modulators 56 and 58 through a pair of phase shift networks 62 and 64, respectively. The circuit constants of networks 62 and 64 are selected to produce voltages having a ninety degree phase shift between them. The output signals of modulators 56 and 58 contain voltages of a frequency equal to the difference frequency between the outputs of photocell 52 and the variable frequency oscillator 60 (lower side band) and have a phase rotation between them determined by the direction of the difference. The upper side band may be filtered out or may be disregarded, since the motor to which it is fed will not respond to high frequencies owing to the inertia of the rotor. These resulting difference frequency voltages are impressed on the respective windings of a synchronous motor 65 which drives a shaft 66 connected to the variable element of oscillator 60. We also feed the output signals of networks 62 and 64 to a second synchronous motor 68 which drives a shaft 70 at a speed proportional to the ratio of the desired ground speed to altitude.

We employ a roller, ball and disk multiplier, indicated generally by the reference numeral 72, to correct for altitude. Shaft 70 drives the disk 74 of the multiplier. The balls 76 of the multiplier are arranged within housing 78 which has a threaded shaft 80 rotatably mounted therein. Shaft 80 passes through a threaded bracket 82 on the meter frame (not shown). We rotate shaft 80 as a function of the altitude by means of a knurled knob 84 on the end of shaft 80 and thereby move balls 76 in and out along a radius of disk 74. The rotation of disk 74 is translated by balls 76 to roller 86 which drives a shaft 88 at a speed proportional to ground speed. Shaft 88 may drive a suitable indicating means 90, such as a tachometer calibrated in true ground speed units or the input shaft of a computer of a bomb director. It is to be noted that automatic means may be provided to rotate shaft 80 as the altitude varies, if desired.

The details of the electric circuits indicated in the block diagram of Figure 1 are shown in Figure 2, the blocks of Figure 1 being indicated by broken lines in Figure 2. We feed the output signals of phototubes 14 and 16, which appear respectively across resistors 92 and 94, to the grids 96 and 98 of a pair of amplifier tubes 100 and 102, the plates 104 and 106 of which are connected respectively to sources of positive potential 108 and 110. The output signals of tubes 100 and 102 are impressed on the grids 112 and 114 of second amplifier tubes 116 and 118 through coupling transformers, indicated respectively by the reference characters 120 and 122. The plates 124 and 126 of tubes 116 and 118 are also connected to the sources of positive potential 108 and 110.

Each of the balanced modulators 30 and 34 is made up of four copper oxide varistors 128 and produces an output containing a frequency which is the difference between the frequencies impressed across the respective modulator terminals. We connect the output terminal of amplifier tube 118 by a lead 136 to the primary winding 132 of a transformer, indicated generally by reference numeral 134. By a lead 142 in parallel with lead 136, we also connect this output terminal to the primary winding 138 of a second transformer, indicated generally by reference character 140. The secondary winding 144 of transformer 134 is connected across one pair of terminals 146 and 148 of the varistor modulator 30, and the secondary winding 150 of transformer 140 across one pair of terminals 152 and 154 of the varistor modulator 34. The output of amplifier tube 116 is impressed on the primary winding 156 of a transformer, indicated by reference character 158, through the lead network 28, which lead network is made up of a resistor 160 and a capacitor 162. Tube 116 is also connected to the primary winding 164 of a transformer indicated at 166 through a lag network 32, which lag network is made up of a resistor 168 and an inductor 170. We connect the secondary winding 172 of transformer 158 between terminals 174 and 176 of varistor modulator 30 and the secondary winding 178 of transformer 166 across the terminals 180 and 182 of varistor modulator 34.

We impress the difference frequency voltage from the modulator 30 on a winding 184 of the synchronous motor 36 by leads 188 and 190 connected respectively to the center taps of secondary windings 144 and 172 and the voltage from modulator 34 across the other winding 186 of the motor 36 by leads 191 and 192 connected respectively to the center taps of windings 150 and 178. The armature of motor 36 drives gear 40 through shaft 38 indicated by the numeral 194 in Figure 2. Motor 36 also drives meter 48 through shaft 38, gears 42 and 44 and shaft 46. The latter linkage is indicated by the reference character 196 in Figure 2.

Phototube 50 has a load resistor 198 connected to the grid 200 of an amplifier tube 202 by a conductor 204. The plate 206 of tube 202 is connected to a source of positive potential 208. The output of amplifier tube 202 is impressed on the grid 210 of a second amplifier tube 212 through coupling transformer 214. Modulators 56 and 58 are also of the varistor type, having similar elements 128 to modulators 30 and 34. Tube 212 feeds the primary windings 220 and 222, respectively, of transformers, indicated by numerals 224 and 226. We connect the secondary windings 228 and 230 of each of the transformers 224 and 226 to respective pairs of terminals 232 and 234 and 236 and 238 of varistor modulators 58 and 56.

The variable frequency oscillator 60 includes a thermionic tube 240, the plate 242 of which is connected to a source of positive potential 244. The tuned circuit of the oscillator is connected between the grid 246 and the plate 242 of the tube 240 and has an inductance element 248 and a variable capacitance element 250 in parallel. The output of oscillator 60 appears across resistor 252 coupled to the tuned circuit by a winding 254. We feed the output of the variable frequency oscillator to the primary winding 256 of a transformer, indicated by reference numeral 258, through the lead network 64 made up of resistor 260 and condenser 262. We also impress this output on the primary winding 264 of a transformer indicated at 266 through the lag network 62 consisting of resistor 268 and inductance 270. The secondary windings 272, and 274, respectively, of transformers 258 and 266 are connected between respective pairs of terminals 276 and 278 and 280 and 282 of varistor modulators 58 and 56. The output of modulator 58 is impressed on winding 284 of synchronous motor 65 by leads 286 and 288. Likewise, we impress the output of modulator 56 on winding 290 of motor 64 by leads 292 and 294. Motor 65 drives the variable element 250 of oscillator 60 through its shaft 66.

The output of oscillator 60 also energizes each of the windings 298 and 300 of motor 68 through conductors 302 and 304, respectively, from the lag and lead networks 62 and 64. Motor 68 drives disk 74 through shaft 70.

In use, gratings 10 and 12 are first disposed at a particular angle, for example forty-five degrees, with respect to the line of flight or desired heading of the airplane. As a result each of them has an output, the frequency of which is a function of the velocity of the projected image across the grating surface and the angle at which the grating is disposed with respect to the line of flight. We feed the output signal of phototube 16 to the amplifier 26 and thence to each of the balanced modulators 30 and 34 and the output of phototube 14 through amplifier 24 and thence through the lead and lag networks 28 and 32 to the balanced modulators 30 and 34, respectively. The outputs of the modulators will be of a frequency equal to the difference in frequency of the outputs of the photocells 14 and 16 and have a phase rotation between them determined by the direction of the difference. If the aircraft has no drift, that is, it is actually travelling along the desired line of flight, the frequency of both of the outputs of tubes 14 and 16 will be the same. Therefore, there will be no difference frequency output from modulators 30 and 34, and the armature of motor 36 will not be rotated. If, however, there is a deviation in the direction of the actual flight line, each of the gratings 10 and 12 is disposed at a different angle with respect to this flight line, and the phototube output frequencies are different. Therefore, modulators 30 and 34 have outputs of a frequency equal to this difference, which is a measure of the amount of the deviation of the line of flight and a phase rotation between them determined by the direction of the difference. These output signals energize motor 36 and cause the motor armature to rotate grating disks 10 and 12 simultaneously so that they are each positioned at the same angle with respect to the new flight line. The direction of rotation of shaft 38 is determined by the direction of deviation of the flight line. When both gratings are disposed at the same angle with respect to the line of flight, there will be no difference frequency output from the modulators and the armature of motor 36 will not rotate. The rotation of shaft 38 is translated to shaft 36 of meter 48 by gears 42 and 44 and meter 48 is calibrated in terms of drift angle.

We arrange grating 50 with its lines perpendicular to the line of flight so that the output of phototube 52 is a function of ground speed over altitude. This output is fed to balanced modulators 56 and 58 through amplifier 54. The output of variable frequency oscillator 60 is also fed to modulators 56 and 58, respectively, through phase shift networks 62 and 64. The modulators produce a signal having a frequency equal to the difference in frequency between the output of photocell 52 and the output of oscillator 60, and a phase rotation determined by the direction of the difference. This difference frequency output energizes the windings of synchronous motor 65 so that shaft 66 rotates in a direction determined by the magnitude of the difference to vary element 250 of oscillator 60 until the frequency of oscillator 60 is equal to that of the output of photocell 52. The output of oscillator 60 is also applied through networks 62 and 64 to each of the windings of two-phase motor 68, and the speed of rotation of shaft 70 of motor 68 is a function of the frequency of the output of oscillator 60. Since this frequency is a function of ground speed over altitude, the speed of rotation of shaft 70 and disk 74 is a function of ground speed over altitude. Balls 76 of multiplier 72 are moved in and out along a radius of disk 74 in accordance with variations in altitude so that the speed rotation of roller 76 will be proportional to ground speed. Suitable measuring means 90, such as a tachometer, may be connected to the roller by a shaft 88 and calibrated in appropriate ground speed units.

If a deviation in the line of flight occurs, grating 50 will no longer be perpendicular to the line of flight. The output of photocell 52 will no longer be proportional to ground speed over altitude, but will also be a function of the angle grating 50 makes with the line of flight. Therefore, the device will no longer give a true indication of ground speed but an indication which is some function of drift. We have constructed our meter so that a drift correction is automatically made. The rotation of shaft 38 is a measure of drift, and gear 40 on shaft 38 rotates gratings 10 and 12 when a deviation in flight line occurs to return them to positions where they make the same angle with the line of flight. We arrange our system so that gear 40 also engages teeth 39 in grating 50 and rotates the grating to return it to a position perpendicular to the line of flight when a deviation occurs. As a result, the rotation of shaft 70 will always give a true indication of the ratio of ground speed to altitude. Stated simply, our system functions so that the drift angle measuring unit cooperates with the ground speed measuring system to correct the latter automatically for drift.

It is to be noted that we utilize the feed-back principle to insure that extremely accurate measurements are obtained. The correction initiated by the frequency difference of the outputs of photocells 14 and 16 is fed to motor 36 which rotates gratings 10 and 12 to a degree corresponding to the amount of the correction. The rotation of the gratings, in turn, varies the outputs of tubes 14 and 16 an amount corresponding to the correction initiated. That is, the correction initiated is immediately fed back to the correcting element so that if the correction initiated is too large or too small, the correcting element immediately senses this fact. Likewise, the output of modulators 56 and 58 (the correcting elements) vary the output of oscillator 60, and this correction is immediately fed back to the modulators 56 and 58 through the networks 62 and 64. Therefore, the output of the device for either drift angle or ground speed, when a deviation is detected, exhibits corrections characteristic of the exponential decay type with the correction rate proportional to the deviation, and errors in the system are asymptotically reduced.

Thus it will be seen that we have accomplished the objects of our invention. We have provided a photoelectric drift angle and ground speed meter wherein extremely accurate measurements of both drift angle and ground speed are obtained. In addition, we arrange our system so that the drift angle correction continuously varies the ground speed system so that the ground speed measurement is always corrected automatically for drift angle. We have employed the feed-back system to insure that extremely accurate measurements of drift angle and ground speed are achieved. Our ground speed appears as the rotation of a shaft which may be measured or employed to provide ground speed input to a bombing director.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A photoelectric drift angle and ground speed meter for aircraft including in combination three photoelectric elements, a plurality of gratings having alternate opaque and transparent areas, each of the gratings being rotatably mounted between one of said elements and the terrain over which the aircraft is passing, means for comparing the output signals of a pair of said elements to obtain a first signal containing voltage having a frequency equal to the difference in frequency between the output signals of said pair of elements and a phase rotation corresponding to the direction of the difference in frequency, a variable frequency oscillator, means for comparing the output signal of the third of said elements with the output signal of said variable frequency oscillator to obtain a second signal having a frequency equal to the difference frequency between the output signals of said third device and the variable frequency oscillator, means responsive to said first signal for maintaining the gratings associated with said pair of elements with their areas at the same angle with respect to the line of flight and the grating associated with said third element with its areas at a predetermined angle with respect to the line of flight, means responsive to said second signal for varying the frequency of said variable frequency oscillator in a direction to reduce said second signal and means responsive to the output of said oscillator as a function of ground speed.

2. A photoelectric drift angle and ground speed meter as in claim 1 including indicating means operatively connected to said means responsive to the first signal to indicate the drift angle of the aircraft.

3. A photoelectric drift angle and ground speed meter as in claim 1 in which said means for comparing the output signals of the pair of the elements includes a pair of amplifiers each associated respectively with one of said pair of elements, a pair of phase shift networks and a pair of balanced modulators, means for feeding the output signal of one of said amplifiers to each of said modulators, means for feeding the output signal of the other of said amplifiers to each of said phase shift networks and a channel for impressing the output signal of each phase shift network upon respective modulators.

4. A photoelectric drift angle and ground speed meter as in claim 1 in which said means for comparing the output signal of the third element with the output signal of the variable frequency oscillator includes an amplifier associated with said third element, a pair of phase shift networks and a pair of balanced modulators, means for feeding the output signal of said amplifier to each of said modulators, means for feeding the output signal of said oscillator to each of said phase shift networks and a channel for impressing the output signal of each phase shift network upon respective modulators.

5. A photoelectric drift angle and ground speed meter as in claim 1 in which said means responsive to the oscillator output includes a pair of phase shift networks associated with said oscillator, a two-phase motor fed by said networks and a roller, ball and disk multiplier driven by said motor.

6. A photoelectric ground speed meter for aircraft including in combination a photoelectric element, a grating having alternate opaque and transparent areas, said grating being rotatably mounted between said element and the terrain over which the aircraft is traveling, a variable frequency oscillator, means for comparing the output signal of said oscillator with the output signal of said element to obtain a control signal having a frequency equal to the difference frequency between the output signals of said oscillator and said device, means responsive to said control signal to vary the frequency of said oscillator in a direction to reduce the control signal, means responsive to the output of the oscillator as a function of ground speed and means for maintaining said grating with its areas at a predetermined angle with respect to the line of flight.

7. A photoelectric ground speed meter as in claim 6 in which said means for maintaining said grating at a predetermined angle with respect to the line of flight includes a pair of photoelectric elements, a pair of gratings, means for comparing the output signals of said pair of elements to obtain a second control signal and means responsive to said second control signal for maintaining said grating with its areas at a predetermied angle with respect to the line of flight of the aircraft and said pair of gratings with their areas at the same angle with respect to said line of flight.

References Cited in the file of this patent

UNITED STATES PATENTS

| | | |
|---|---|---|
| 1,664,454 | Hunt et al. | Apr. 3, 1928 |
| 1,803,834 | Bates | May 5, 1931 |
| 1,977,762 | Gatty | Oct. 23, 1934 |
| 2,167,484 | Berry | July 25, 1939 |
| 2,425,541 | Konet | Aug. 12, 1947 |
| 2,565,213 | Faulkenstein | Aug. 21, 1951 |
| 2,772,479 | Doyle | Dec. 4, 1956 |